(12) United States Patent
Schilling

(10) Patent No.: US 10,082,244 B1
(45) Date of Patent: Sep. 25, 2018

(54) SPILL BERM WITH INFLATABLE SLEEVED AIR PILLOWS AND METHOD OF INFLATING

(71) Applicant: PacTec, Inc., Clinton, LA (US)

(72) Inventor: Michael Schilling, Clinton, LA (US)

(73) Assignee: PacTec, Inc., Clinton, LA (US)

( * ) Notice: Subject to any disclaimer, the term of this patent is extended or adjusted under 35 U.S.C. 154(b) by 71 days.

(21) Appl. No.: 15/008,040

(22) Filed: Jan. 27, 2016

Related U.S. Application Data

(60) Provisional application No. 62/108,591, filed on Jan. 28, 2015.

(51) Int. Cl.
| | |
|---|---|
| *F16N 31/00* | (2006.01) |
| *B65D 1/34* | (2006.01) |
| *B65D 90/24* | (2006.01) |

(52) U.S. Cl.
CPC ............ *F16N 31/006* (2013.01); *B65D 1/34* (2013.01); *B65D 90/24* (2013.01)

(58) Field of Classification Search
CPC .......... F16N 31/006; B65D 90/24; B65D 1/34
See application file for complete search history.

(56) References Cited

U.S. PATENT DOCUMENTS

| | | | | |
|---|---|---|---|---|
| 3,065,774 | A | * 11/1962 | Grimes | ................ A47C 27/081 141/38 |
| 3,844,319 | A | * 10/1974 | Cristante | ................. F16K 15/20 123/198 C |
| 4,197,895 | A | * 4/1980 | Reyes | ................... B60B 39/028 141/38 |
| 4,981,391 | A | 1/1991 | Klementovich | |
| 5,423,339 | A | * 6/1995 | Latimer | .................. B08B 17/00 134/104.2 |
| 5,560,782 | A | * 10/1996 | Latimer | .................. B08B 17/00 134/10 |
| 5,797,994 | A | * 8/1998 | Rasmussen | ............... B08B 3/00 134/10 |
| 6,779,618 | B2 | * 8/2004 | Tarasinski | ............. B60C 23/003 180/41 |
| 6,880,720 | B2 | 4/2005 | Van Romer | |
| 8,016,151 | B2 | 9/2011 | Barrett et al. | |
| 8,448,661 | B2 | * 5/2013 | McDonald | ................ E04B 9/00 137/313 |
| 8,479,946 | B2 | 7/2013 | Matson | |

OTHER PUBLICATIONS

Crushproof Tailpipe Adapters, retrieved from http://www.crushproof-hose.com/PDF/tailpipe-adapters.pdf on Dec. 5, 2016.

* cited by examiner

*Primary Examiner* — Nicolas A Arnett
(74) *Attorney, Agent, or Firm* — Jones Walker LLP

(57) ABSTRACT

A spill berm that includes a floor portion and a sidewall portion sealingly attached to the floor portion. The floor portion and the sidewall portion have an interior side that is constructed from a material that is impermeable to a desired fluid, and the said sidewall portion further includes a sleeve having a hollow interior and at least one open end. Inflatable removable air pillows are positioned partly in said interior of the sleeve, where the air pillow having an inflation valve e located on the air pillow near the open end of said sleeve, and the valve is attachable to a hose connected to the exhaust pipe of a diesel or gasoline engine.

9 Claims, 3 Drawing Sheets

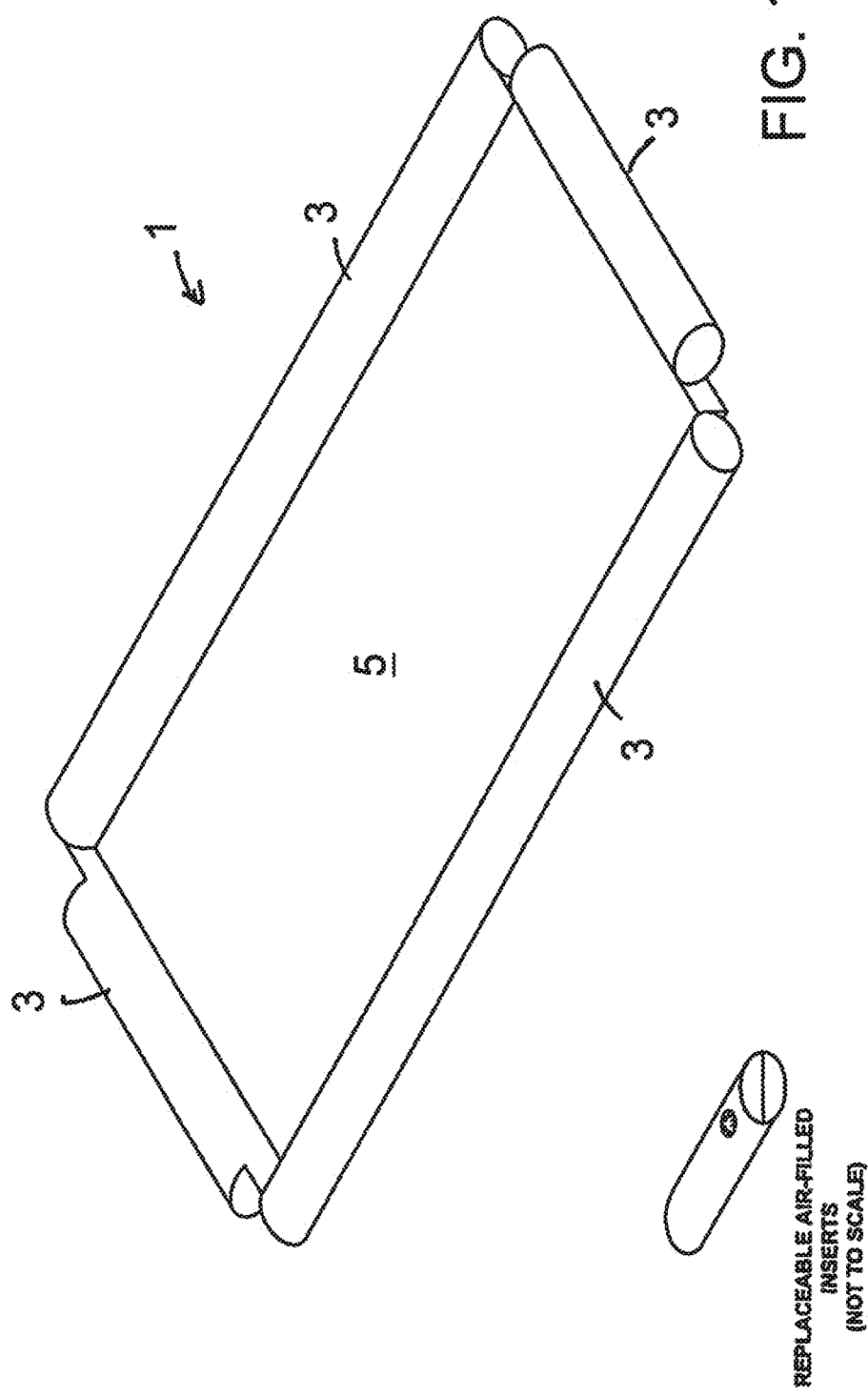

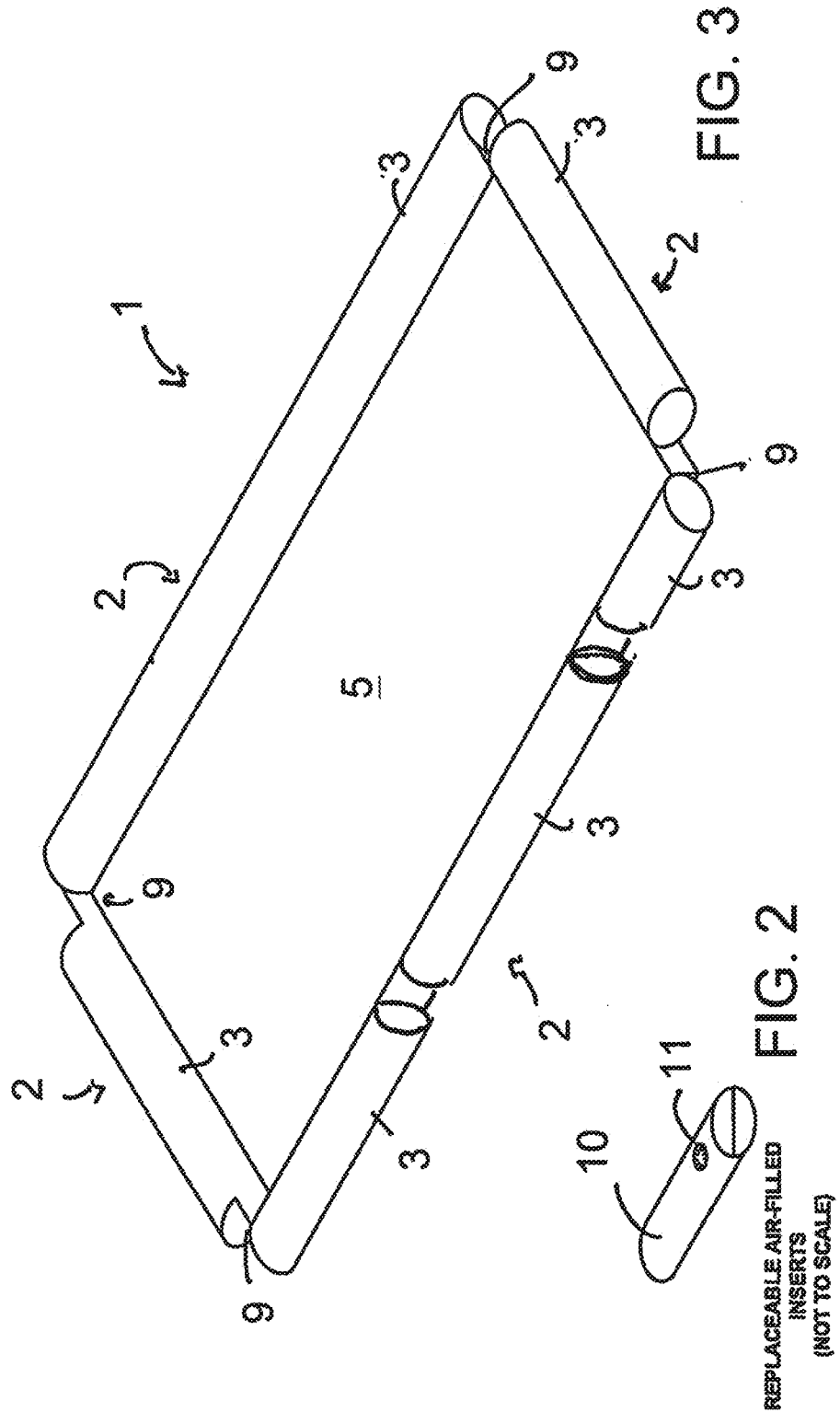

SPILL BERM WITH INFLATABLE SLEEVED AIR PILLOWS AND METHOD OF INFLATING

I. CROSS-REFERENCE TO RELATED APPLICATION

This application claims the benefit under 35 U.S.C. § 119(e) to U.S. Provisional Application Ser. No. 62/108,591, filed on Jan. 28, 2015, which is incorporated by reference herein in its entirety.

II. FIELD OF THE INVENTION

The present invention generally relates to spill containment devices and methods, and more particularly to portable apparatus for catching and containing spills of toxic or environmentally hazardous materials from industrial vehicles and related equipment.

III. BACKGROUND OF THE INVENTION AND DESCRIPTION OF THE PRIOR ART

In a number of industrial processes, machine equipment, including transportation equipment, uses or dispenses liquid materials that may be toxic or otherwise harmful to the environment. Devices such as spill berms have been used to protect against the possibility of a spill from such devices.

A spill berm generally has a fluid impermeable floor and upstanding sidewall, and some means to maintain the sidewall in an upstanding configuration. One desirable characteristic of a spill berm is the ability of a vehicle to enter and exit the spill berm without damaging the berm sidewall. Many spill berms use foldable brackets to keep the sidewalls in an upstanding configuration, such as U.S. Pat. No. 6,880,720. These brackets allow the sidewall to be folded into a flat configuration to allow a vehicle to enter the spill berm without damaging the sidewall. Other spill berms use foam attached to the sidewall of a spill berm, such as U.S. Pat. Nos. 8,479,946 and 8,016,151 (using both brackets and foam) to keep the sidewalls upstanding. Another type of spill berm uses an inflatable swimming pool type of construction, such as that shown in U.S. Pat. No. 4,981,391. The single inflatable sidewall is inflated using compressed air from a compressor or from a tank.

One desirable characteristic of a spill berm is the ability to accommodate vehicle traffic across the spill berm without damaging the spill berm sidewall. For berms that use brackets, this is accomplished using foldable brackets to collapse the sidewall; for sidewalls using compressible foam, since the foam is compressible, vehicles can roll over the sidewall, and the foam will rebound to its uncompressed state after the vehicle crosses the sidewall. Another desirable characteristic is that the spill berm is compact for transportation. The spill berm with brackets is a compact structure, but the spill berm using foam inserts is not as compact due to the foam inserts. Another desired characteristic of a spill berm is ease of assembly and use. While the spill berm using foam inserts is easily assembled and used, the berm using the brackets is more labor intensive to use, as each bracket must to be operated to raise or lower the sidewalls. Installation of the spill berm with an inflatable sidewall with a compressor or compressed air is also time consuming to fill.

What is needed is a spill berm or spill containment device and method of using minimum components that can be easily installed, dismantled, and transported from place to place, and that provides a reliable barrier to spills upon the surface of the ground.

IV. SUMMARY OF THE INVENTION

Accordingly, there is disclosed a portable spill berm containment device comprising a floor and sidewall formed of chemically resistant and preferably puncture resistant fabric. The area of the floor and height of the sidewalls will be dependent on the particular application. The sidewalls include an elongated pocket or sleeve, and located in the pocket interior is a removable, inflatable air pillow. Each air pillow includes a check valve for inflation. Also included with the spill berm is an hose having a fitting on one end to connect to the valve on the air pillow, and a fitting on the other end to connect to a vehicle exhaust pipe.

In other, aspects the air pillows are rapidly inflated using a gas or diesel powered vehicle's exhaust. The air pillows may extend outside the sidewall pockets or be substantially contained within the sidewall pockets. In a rectangular berm configuration, each side of the spill berm may contain multiple air pillows.

In other aspects, braces, brackets or foam members are not required to support the side walls of the spill berm.

In another aspect of the spill berm, the air pillows may be quickly deflated, and remain within the respective sleeves, and the spill berm may be folded and rolled into a compact package for transport, storage, and reuse.

Accordingly there is also provided a method for supporting the side walls of a spill berm with inflatable air pillows, comprising the steps of enclosing inflating the air pillows using vehicle exhaust gases.

V. BRIEF DESCRIPTION OF THE DRAWINGS

FIG. 1 is a prospective view of one embodiment of a portable spill containment device according to the present invention;

FIG. 2 is a prospective view illustrates an air pillow for use in the embodiment illustrated in FIG. 1;

FIG. 3 is a prospective view of another embodiment of a portable spill berm using multiple sleeves along one sidewall.

Figure 4:
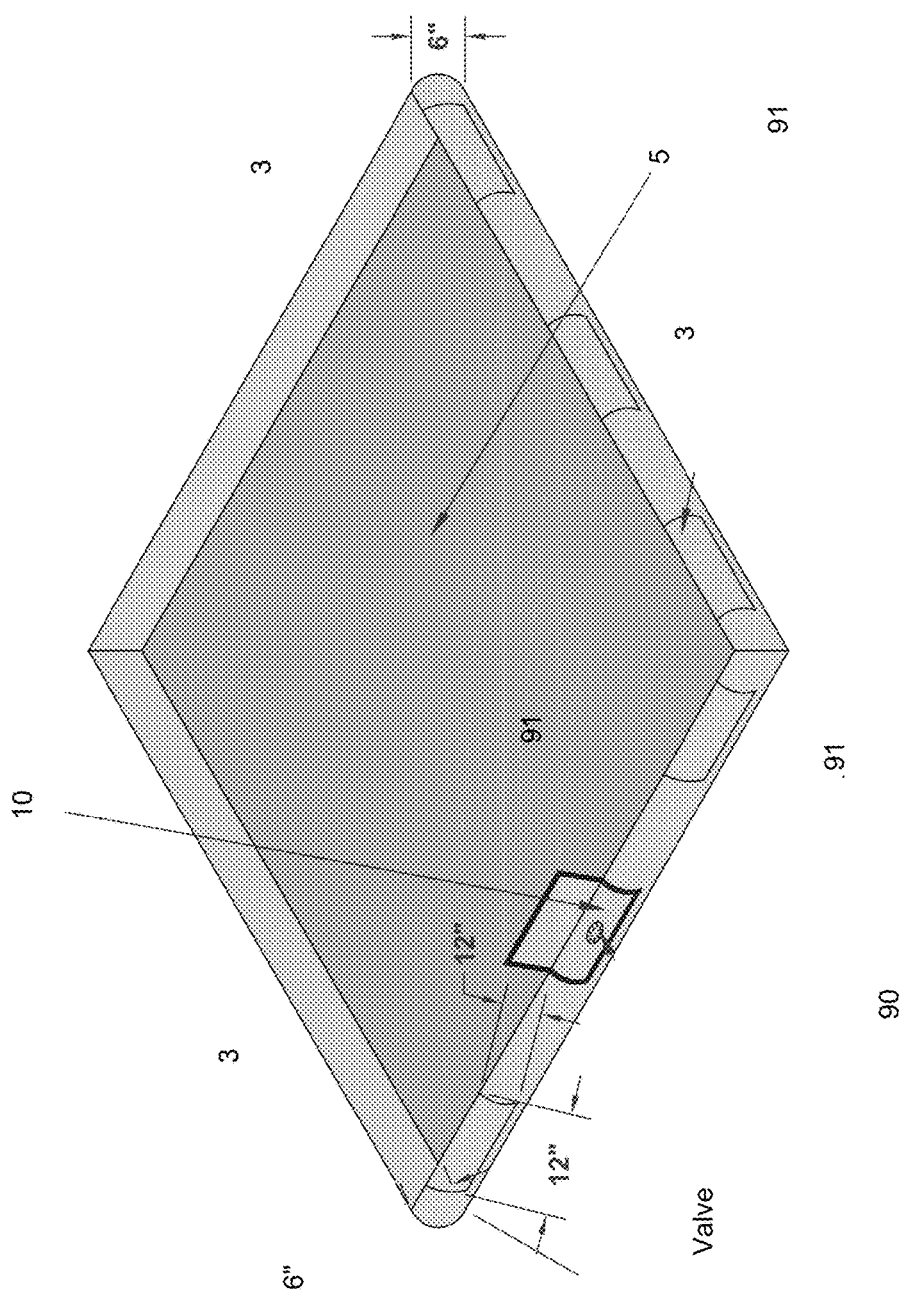

FIG. 4. is a prospective view of another embodiment of a portable spill berm.

VI. DETAILED DESCRIPTION OF THE INVENTION

A portable spill berm 1 is disclosed that provides low cost, light weight, a minimum of component parts, and ease of portability, storage, or installation. The basic device comprises a fabric panel floor 5 and low profile sidewall(s) 2 to retain spilled liquids and debris. The sidewalls, which are preferably formed as upward extensions of the bottom panel floor, form hollow pockets or sleeves 3, generally cylindrically shaped. The sleeves may be formed in the sidewalls, or attached to the sidewall, such as by heat welding or vulcanizing. Shown in FIG. 1 is one embodiment of the spill berm device 1. A rectangular spill berm having a floor portion 5 and four sidewalls 2 is depicted. Each sidewall is formed into a sleeve or pocket 3, having open opposing ends. As shown, the sleeves or pockets 3 are formed facing the exterior of the spill berm, but the sleeves could also be formed on the interior side of the spill berm. As shown, the spill berm 1 has four corners 9 where the floor fabric has been sealingly joined into a leak-proof corner.

The materials can be made from a suitable watertight flexible material, such as 40 mill polyethylene, or polyvinyl chloride (PVC), or vinyl or other suitable flexible polymer material, such as polyester or polyethylene (flexible means that the fabric can be folded or rolled up for transportation and shipping). The material may also be a woven polymer with a coating or a coated scrim material, such as a PVC or chlorinated PVC coating applied to woven polyester, polypropylene or polyethylene or scrim reinforced non-woven geo-membrane fabric, or a two layer construction with a woven outer layer and an inner liquid impermeable liner layer. Preferably the material is abrasion resistant, chemically resistant to the liquids to be retained in the event of a spill, and UV resistant.

Shown in FIG. 2 is one embodiment of an air pillow 10. The air pillow 10 shown is an airtight, tube-like structure with a valve 11 positioned on one end of the pillow. For instance, two sheets of flexible PVC (such as 18 oz pvc) can be joined (such as by heat welding) to form a hollow pillow. The interior is hollow, and preferably lacks any foam. An inflation valve is then sealingly attached to the air pillow. One suitable valve is a Leafield inflation/deflation low profile valve (¾ inch), obtainable from Leafield Marine Ltd., Wiltshire, England. The pockets or sleeves 3 will have at least one air pillow 10 inserted into the pocket. The valve 11 preferably is placed on the air pillow 10 to be easily accessible when the air pillow 10 is inserted into a sleeve 3 of the spill berm. Each pocket or sleeve 3 may have more than one air pillow 10 inserted therein, for instance, two air pillows, where the associated valves are preferably positioned for access on opposing open ends of a sleeve 3. As the air pillows are inflatable, the pillows, if not over-inflated, are also easily deformable. For spill berms with very long sides, instead of a single sleeve 3 on each side, a long sidewall may have a series of sleeves 3, which may be spaced apart from one another. See FIG. 3.

An alternative embodiment is shown in FIG. 4. As shown, the spill berm has a floor portion and sidewall sleeves 3. Each sidewall sleeve 3 has one of more openings 90. The opening 90 can be used to insert an air pillow or air bladder 10 into the opening or to assist in positioning the inserted air pillow 10 through the length of the sleeve 3. Preferably, each air pillow valve will be accessible through one of the openings 90. To protect the valve or the air pillow 10, the opening 90 preferably has a closable flap or cover 91. As shown, in FIG. 4, the cover 91 is a flap formed from a portion of the sidewall fabric. The flap or cover 91 can be maintained in a closed configuration by a closure, such as hook and loop fabric closures, magnets, or other suitable closure devices.

Generally, to assemble the device, the floor and sidewalls or side sleeves 3, including pockets, are preferably formed from a single piece of the selected materials. For large berms, several pieces of materials may need to be joined together, such as by heat welding or other techniques to sealingly join the pieces of fabric. As noted, preferably the sidewall and sleeves 3 are formed from an extension of the floor fabric to avoid seams on the sidewalls, but may be separately formed and joined to the sidewalls or floor. The air pillows 10 are formed from suitable airtight materials (such as by heat sealing two sheets of PVC into a pillow or tubular like structure) and each pillow 10 has a valve installed for inflation/deflation, such as a check valve. The air pillows 10 can be sized to be slightly smaller or slightly larger in cross-sectional area (when inflated to the desired pressure) than the cross-sectional interior area of the sleeve into which it will be inserted. To assemble, the air pillows are inserted into the sleeves in a deflated state, such as through sidewall openings 90. The air pillow may include a grommet at one end to assist insertion of the air pillow into the sleeve 3 (such as by inserting a rope through the sleeve, attaching the rope to the grommet of an air pillow 10, and pulling the rope through the sleeve 3 to advance the pillow 10 though the sleeve 3). To pull an air pillow through a sleeve, tow openings in each sidewall are preferred. The installed air pillows 10 may extend beyond the sleeve if the sleeve 3 is open ended, or be fully contained within the sleeve.

Pull handles, in one example, are formed by optional loops fabricated of heavy duty webbing strap, and attached to the spill berm, for example at each corner of the spill berm, for ease of handling and positioning the berm. Pull handles or loops, for larger sizes of the containment device, may be attached to the sidewalls.

The spill berm, with installed deflated air pillows 10, can be easily folded into a compact package for shipment or storage. Associated with the spill berm is a fill hose. The fill hose preferably has an adaptor on one end that is generally sealingly attachable to the valve on the air pillow 10, and an adaptor on the other end to allow the hose to be attached to the exhaust tail pipe of a gas or diesel vehicle engine or other machine exhaust pipe or tailpipe (such as a diesel generator motor). A suitable tubing and exhaust adaptor is the two inch diameter exhaust tubing and adaptor available from Crushproof Tubing Co of McComb, Ohio. See http://www.crush-proof-hose.com/PDF/tailpipe-adapters.pdf (hereby incorporated reference). Alternatively, the exhaust hose adaptor may simply be a band clamp or other clamp type if the hose is of sufficient diameter to fit over an exhaust pipe. A hose reducer, to size the hose for connection to the air pillow valve, is available from Leafield Marine.

In use, the spill berm is unpacked, positioned at a desired location, and unfolded. Each of the air pillows is inflated using the exhaust gases from a gas or diesel vehicle engine tailpipe or other gas or diesel machine exhaust, using the fill hose (if the air pillows 10 are installed in the sleeve, if not, the pillows 10 are preferably installed prior to inflation). The air pillows 10 are preferably inflated to only slightly above ambient pressure, such as to one PSI above ambient air pressure. In this fashion, the air pillows will support the sidewalls of the spill berm in the event of a spill, but remain easily deformable to allow vehicles to simply roll over the inflated sidewall to access the spill berm interior, without the need to deflate the air pillows. The sleeve 3 protects the air pillow 10 from abrasion that is likely to occur when the wheels of a vehicle pass over the sidewall sleeves 3 of the spill berm. Alternatively, if multiple sleeves 3 are located on one side of a spill berm, gaps between sleeves may be located on the sidewall to allow a vehicle's tires to pass through the gaps.

As described, the system is easily shipped and installed. Further, the air pillows 10 are removable from the sleeves 3, allowing an air pillow 10 to be removed from the spill berm for repair or replacement. Other embodiments of the spill berm are within the scope of the invention. For instance, instead of using a closed one piece sleeve, the sleeve may be formed from a sidewall flap that is closable and secured around an air pillow with ties or other fasteners, such as hook and loop fasteners, such as shown in U.S. Pat. No. 8,479,946 hereby incorporated by reference. The fasteners may be attached to the top of the sidewall or the base of the sidewall.

The invention as described is easily assembled and disassembled, shipped ready for inflation, and is inflated with a vehicle's exhaust gases from the vehicles' gas or diesel engine. Consequently, a compressor or air pump is not required to deploy the spill berm. While the invention has been described in detail in only one of its forms, it is not thus limited, but is susceptible to various changes and modifications without departing from the spirit thereof. Many of these variations are mentioned in the foregoing detailed description. The alternatives mentioned are provided to illustrate useful variations but not intended to limit the invention to specific embodiments. For instance, the materials selected for the illustrated embodiment may be varied to accommodate particular applications without departing from the spirit of the invention as set forth in the claims. Other examples of variations are the number and location of handholds, the height of the side walls, the number of sleeves and the number of air pillows. For instance, the fill hose may include a separate pressure-activated shut off valve to avoid over inflating the air pillows. Another embodiment can include a spill berm where one sleeve may have a resilient crushable foam member or members replacing one of the air pillows in one of more of the sleeves. An open cell foam member may be used, such as urethane foam. While not preferred, as the spill berm is less compact for shipping, areas along one wall use foam for accommodating vehicle traffic. Additionally, the corners of the spill berm may have foam supports attached to the berm for additional support in the corners. The corner foam may be buoyant, or not.

The invention claimed is:

1. A method of providing spill protection comprising the steps of
    a. providing a spill berm comprising a flexible floor portion and a flexible side wall portion sealingly attached to the floor portion, the floor portion and the sidewall portion having an interior side that is impermeable to a desired fluid, said sidewall portion further comprising at least one sleeve having a hollow interior and at least one opening therein, said spill berm further comprising at least one inflatable air pillow positioned partly in said interior of said sleeve, said air pillow having an inflation valve, said inflation valve located on said air pillow near said opening in said sleeve;
    b. providing a fill hose having a first and second end, said first end attachable to said valve and the second end attachable to an exhaust pipe on an engine;
    c. positioning said spill berm at a desired location;
    d. attaching said first end of said hose to said valve; and attaching said second end of said hose to an exhaust pipe of a gas or diesel engine; and
    e. inflating said air pillow with the exhaust gases exiting said exhaust pipe.

2. The method of claim 1 wherein said spill berm is rectangularly shaped and comprises four sidewall portions, each sidewall portion forming a sleeve, each sleeve on each sidewall having one of said air pillows positioned partly in said sidewall sleeve.

3. The method of claim 2 wherein each sleeve on each sidewall has two opposing open ends.

4. The method of claim 2 wherein each sleeve contains an opening therein, said opening closable by a flap.

5. The method of claim 4 wherein said flap contains a closure to maintain said flap in a closed position.

6. The method of claim 5 where said closure is composed of loop and hook fabric sections.

7. The method of claim 4 wherein each sleeve contains at least two openings therein.

8. The method of claim 1 wherein said spill berm lacks foldable braces.

9. A method of supporting the sidewall of a spill berm comprising a flexible floor portion and a flexible side wall portion sealingly attached to the floor portion, the method comprising the steps of attaching a sleeve having a hollow interior to said sidewall of said spill berm, said hollow sleeve having at least one opening therein, inserting an inflatable air pillow having an inflation valve partly in said interior of said sleeve through said opening, said inflation valve located near said opening in said sleeve, and inflating said air pillow using exhaust gases from the exhaust pipe of a gas or diesel engine.

* * * * *